(12) United States Patent
Zhang et al.

(10) Patent No.: US 12,190,492 B2
(45) Date of Patent: Jan. 7, 2025

(54) METHOD AND SYSTEM FOR SURFACE DEFECT DETECTION BASED ON FEW-SHOT LEARNING

(71) Applicant: 38TH RESEARCH INSTITUTE, CHINA ELECTRONICS TECHNOLOGY GROUP CORPORATION, Hefei (CN)

(72) Inventors: Hongqi Zhang, Hefei (CN); Yue Tian, Hefei (CN); Xingyu Chen, Hefei (CN); Liangxi Chen, Hefei (CN)

(73) Assignee: 38TH RESEARCH INSTITUTE, CHINA ELECTRONICS TECHNOLOGY GROUP CORPORATION, Hefei (CN)

( * ) Notice: Subject to any disclaimer, the term of this patent is extended or adjusted under 35 U.S.C. 154(b) by 0 days.

(21) Appl. No.: 18/764,824

(22) Filed: Jul. 5, 2024

(65) Prior Publication Data

US 2024/0362762 A1 Oct. 31, 2024

Related U.S. Application Data

(63) Continuation of application No. PCT/CN2022/133525, filed on Nov. 22, 2022.

(30) Foreign Application Priority Data

Mar. 14, 2022 (CN) .......................... 202210247802.7

(51) Int. Cl.
*G06T 7/00* (2017.01)
*G06V 10/54* (2022.01)
(Continued)

(52) U.S. Cl.
CPC ............ *G06T 7/0002* (2013.01); *G06V 10/54* (2022.01); *G06V 10/774* (2022.01); *G06V 10/82* (2022.01);
(Continued)

(58) Field of Classification Search
CPC ......... G06T 7/0002; G06T 2207/20032; G06T 2207/20081; G06T 2207/20084; G06V 10/54; G06V 10/774; G06V 10/82
See application file for complete search history.

(56) References Cited

U.S. PATENT DOCUMENTS

2019/0369175 A1* 12/2019 Schwartz ................. B01J 27/20
2020/0160083 A1* 5/2020 Zhu .......................... G06N 3/08

FOREIGN PATENT DOCUMENTS

CN 113160184 A 7/2021
CN 113379699 A * 9/2021
(Continued)

*Primary Examiner* — Ping Y Hsieh (57) ABSTRACT

A surface defect detection method for a primary cable of an aerostat based on few-shot learning includes the following steps. A hardware and software system environment is set. A surface image of the primary cable is acquired and processed to obtain augmented surface image data, which is labeled to construct a surface defect sample library. A defect detection network model is designed and constructed, and then is trained based on the surface defect sample library. A query set in the surface defect sample library is processed with the trained defect detection network model to obtain shallow texture features and high-level semantic features. The shallow texture features are transferred to the high-level semantic features through skip connection. The surface defect detection data under different detection operation modes are obtained at a terminal. This application also provides a surface defect detection system.

10 Claims, 9 Drawing Sheets

(51) Int. Cl.
*G06V 10/774* (2022.01)
*G06V 10/82* (2022.01)

(52) U.S. Cl.
CPC ............... *G06T 2207/20032* (2013.01); *G06T 2207/20081* (2013.01); *G06T 2207/20084* (2013.01)

(56) References Cited

FOREIGN PATENT DOCUMENTS

| CN | 114092389 | A |   | 2/2022 |
|----|-----------|---|---|--------|
| CN | 114170161 | A |   | 3/2022 |
| CN | 114663375 | A | * | 6/2022 |

* cited by examiner

METHOD AND SYSTEM FOR SURFACE DEFECT DETECTION BASED ON FEW-SHOT LEARNING

CROSS-REFERENCE TO RELATED APPLICATIONS

This application is a continuation of International Patent Application No. PCT/CN2022/133525, filed on Nov. 22, 2022, which claims the benefit of priority from Chinese Patent Application No. 202210247802.7, filed on Mar. 14, 2022. The content of the aforementioned application, including any intervening amendments thereto, is incorporated herein by reference in its entirety.

TECHNICAL FIELD

This application relates to defect detection for aerostat cables, and more specifically to a method and system for surface defect detection of a primary cable of an aerostat based on few-shot learning.

BACKGROUND

The outer sheath on the cable surface is a structural part for protecting the cable insulation layer from being eroded by external factors, and mainly plays a role in improving the mechanical strength, and anti-chemical corrosion, waterproofing and anti-burning performances of the cable. Nevertheless, during the production process of the cable, surface defects, such as creases, scratches, small holes, bulging, and insulation damage, will inevitably occur due to limitations of the manufacturing equipment, the production process and raw materials. These defects will damage the product performance and affect commercial use, and some serious apparent defects may even cause safety hazards in the actual use.

Chinese Patent Application No. 202111068447.9 discloses a surface defect detection of a glass panel based on few-shot learning, which includes the following steps. (S1) A small number of defective images of the glass panel are collected, and the bounding boxes and defect categories are marked. (S2) The defective images of the glass panel are pre-processed and augmented to construct a surface defect detection data set of the glass panel. (S3) A defect detection network is constructed for identifying and localizing the glass panel images, which includes a backbone feature extraction network including a deep residual network (ResNet) 101 and a feature pyramid network, an improved Region Proposal Network (RPN), a region of interest (ROI) pooling layer, a global ROI extraction layer, a bounding-box regression network, and a classification network, where the backbone feature extraction network is configured to extract global features of the image; the improved RPN network and the ROI pooling layer are configured to extract features of the region proposal of the image; the global ROI extraction layer is configured to fuse the global features and the features of the region proposal, and update the features of the region proposal; and the bounding-box regression network and the classification network are configured to generate localization bounding boxes and defect categories based on the updated features of the region proposal. (S4) The constructed defect detection network is trained using the surface defect detection data set of the glass panel to obtain a trained defect detection model. (S5) Defect detection is performed on the glass panel images based on the trained defect detection model to output the defect localization bounding box and the defect category. Although the aforementioned prior art literature has adopted the few-shot learning and sample augmentation, the specific technical solutions are different from those disclosed in the present application. For example, the present application adopts a different defect detection network model. Moreover, the aforementioned method is not applied in the field of cable detection for aerostats, nor for the cable detection. At present, the cable surface defect detection mainly relies on manual visual inspection and hand-touch judgment, which struggle with poor detection efficiency, and high false detection rate and missed detection rate. Therefore, it is urgently to remedy the deficiencies of high false detection rate, high missed detection rate, and low detection efficiency in the existing detection technology for the aerostat cables.

SUMMARY

An objective of the present disclosure is to solve the technical problems in the prior art, such as high false detection rate, high missed detection rate, and low detection efficiency.

To solve the above technical problems, the following technical solutions are adopted.

In a first aspect, this application provides a surface defect detection method for a primary cable of an aerostat based on few-shot learning, comprising:

(S1) initializing a system environment; and setting system parameters and detection operation modes;

(S2) acquiring a surface image of the primary cable of the aerostat; processing the surface image by augmentation through a preset adversarial network to obtain an augmented surface image data of the primary cable; and labeling the augmented surface image data to construct a surface defect sample library of the primary cable;

(S3) designing a defect detection network model of the primary cable based on a dense convolutional network (DenseNet) and defect characteristics of the primary cable; constructing the defect detection network model by few-shot learning; and training the defect detection network model based on the surface defect sample library to obtain a trained defect detection network model;

(S4) processing a query set in the surface defect sample library based on the trained defect detection network model using a YOLOv4 single-stage detection algorithm to obtain shallow texture features and high-level semantic features;

(S5) transferring the shallow texture features to the high-level semantic features through skip connection using a structure of the DenseNet of the trained defect detection network model; and processing the shallow texture features and the high-level semantic features through the following metric logic:

$$\omega_c = \frac{1}{S_c} \sum_{x \in S_c} f_\theta(x_{sc}); \tag{1}$$

$$\mathrm{euc}(x, \omega_c) = |x - \omega_c| \# \tag{2); and}$$

$$p(y = c|x) = \frac{\exp(-\mathrm{euc}(f_\theta(x), \omega_c))}{\sum_{c'} \exp(-\mathrm{euc}(f_\theta(x), \omega_{c'}))}; \tag{3}$$

wherein $\omega_c$ represents a mean value of all samples belonging to category c after a function change; euc(x, $\omega_c$) represents a distance function; and p(y=c|x) represents a probability function, and is configured to obtain surface defect detection data of the primary cable of the aerostat; $S_c$ represents image samples of the category c in a support set; $x_{sc}$ represents a certain image sample of the category c extracted from $S_c$; x represents an image of the query set; and c represents a sample category; and (S6) selecting the detection operation modes one by one at a terminal to obtain the surface defect detection data under different detection operation modes.

In the present disclosure, the YOLOv4 single-stage detection algorithm based on deep neural network is selected as the benchmark algorithm for cable defect detection, which has certain technical advantages among the current target detection algorithms and has a better detection effect under the same algorithmic consuming time. To comprehensively use the shallow texture features and the high-level semantic features, the DenseNet network is selected as the basic framework of the detection algorithm in the present disclosure, which frequently passes the low-level features to the high-level features through jump connections, facilitating to improve the detection effect.

In an embodiment, step (S1) comprises:
(S11) collecting and storing operation environment data of the primary cable; and
(S12) setting up an image acquisition device and presetting an image filter according to the operation environment data.

In an embodiment, a filtering method of the image filter comprises median filtering.

In an embodiment, the image acquisition device comprises two or more cameras; and the two or more cameras are arranged at a position where the surface image of the primary cable is acquired.

In an embodiment, step (S2) comprises:
(S21) acquiring, by the image acquisition device, the surface image of the primary cable of the aerostat;
(S22) processing the surface image by augmentation to obtain an augmented surface image of the primary cable;
(S23) processing the augmented surface image through the preset adversarial network according to the following logical augmentation to obtain the augmented surface image data:

$$\nabla_{\theta_d} \frac{1}{m} \sum_{i=1}^{m} \left[\log D(x^{(i)}) + \log(1 - D(G(z^{(i)})))\right]$$

$$-\nabla_{\theta_g} \frac{1}{m} \sum_{i=1}^{m} \log(1 - D(G(z^{(i)}))); \text{ or}$$

$$\nabla_{\theta_g} \frac{1}{m} \sum_{i=1}^{m} \log(D(G(z^{(i)})));$$

wherein m represents the number of samples; Z represents a random noise sample; X represents a real sample; D represents a discriminator; G represents a generator; $\nabla$ represents a gradient; and $\theta$ expresses a constant; and
(S24) labeling the augmented surface data to construct the surface defect sample library of the primary cable.

The present disclosure is directed against challenges, such as uneven defective samples, difficulty in manual annotation and diverse changes in the field environment, to expand the diversity of existing samples using image enhancement while expanding the samples by constructing an adversarial neural network.

In an embodiment, in step (S21), the surface image of the primary cable of the aerostat comprises a lightning-strike damage image, a crack image and a normal image.

Considering that the perforations, cracks at end point of the cable are very small defects, and therefore are likely to be lost in the high-level features after extracted layer by layer by deep neural network. In the meanwhile, the high-level features have a strong semantic nature, which is of great significance in the classification judgement. Therefore, the present disclosure selects the DenseNet network as the basic framework of the detection algorithm, which is configured to transfer the low-level features to the high-level features through jumping connection, so as to improve the detection effect of subtle defects (e.g., perforations and cracks) at the endpoint.

In an embodiment, step (S3) comprises:
(S31) obtaining the defect characteristics of the primary cable; and designing the defect detection network model of the primary cable according to the defect characteristics with the DenseNet as a basic framework; and
(S32) constructing, by a few-shot learning coder, the defect detection network model; and training the defect detection network model using Focal loss and label smoothing strategy based on a support set in the surface defect sample library of the primary cable.

The present disclosure adopts the Focal loss and label smoothing strategy during deep neural network training to further mitigate the effects of category imbalance.

In an embodiment, step (S32) comprises:
(S321) extracting the support set from the surface defect sample library of the primary cable;
(S322) setting the number of convolutional layers of the few-shot learning encoder in the defect detection network model to be 4;
(S323) setting a size of each of the convolutional layers to be 3*3; and
(S324) setting a convolution kernel of the few-shot learning encoder to be 64.

In an embodiment, in step (S6), the detection operation modes comprise an image acquisition mode, an offline detection mode and an online detection mode; the image acquisition mode is configured to collect images captured by a camera for post-processing; the offline detection mode is configured to perform defect detection on locally-captured images; and the online detection mode is configured to integrate the image acquisition mode and the offline detection mode for online detection of the surface defect detection data of the primary cable.

In the present disclosure, to satisfy the actual needs of field operators, three operation modes, namely, the image acquisition mode, the offline detection mode and the online detection mode, are provided herein. The image acquisition mode is only for collecting images captured by the camera to facilitate post-processing. The offline detection mode is configured to perform defect detection on the locally collected images. The online detection mode is configured to perform defect detection while collecting images, and can be interpreted as a fusion of image collection and offline inspection. The three operation modes have different hardware requirements and operating characteristics, where the online detection mode has higher hardware configuration requirements. The field staff make arrangements according to the site hardware configuration and the usage demand, which is easier to operate.

In a second aspect, this application provides a surface defect detection system for a primary cable of an aerostat based on few-shot learning, comprising:

a hardware-software integrated environment setting module;

a sample library construction and augmentation module connected to the hardware-software integrated environment setting module;

a model construction and training module connected to the sample library construction and augmentation module;

a feature acquisition module connected to the model construction and training module;

a defect detection module connected to the feature acquisition module; and a multi-mode operation module connected to the defect detection module and the hardware-software integrated environment setting module;

wherein the hardware-software integrated environment setting module is configured to initialize a system environment and set system parameters and detection operation modes;

the sample library construction and augmentation module is configured to acquire a surface image of the primary cable of the aerostat, process the surface image by augmentation through a preset adversarial network to obtain an augmented surface image data of the primary cable, and label the augmented surface image data to construct a surface defect sample library of the primary cable;

the model construction and training module is configured to design a defect detection network model of the primary cable based on DenseNet and defect characteristics of the primary cable, construct the defect detection network model using few-shot learning, and train the defect detection network model based on the surface defect sample library to obtain a trained defect detection network model;

the feature acquisition module is configured to process a query set in the surface defect sample library based on the trained defect detection network model using a YOLOv4 single-stage detection algorithm to obtain shallow texture features and high-level semantic features;

the defect detection module is configured to transfer the shallow texture features to the high-level semantic features through skip connection using a structure of the DenseNet of the trained defect detection network model, and process the shallow texture features and the high-level semantic features through the following metric logic:

$$\omega_c = \frac{1}{S_c} \sum_{x \in S_c} f_\theta(x_{sc}); \quad (1)$$

$$\text{euc}(x, \omega_c) = |x - \omega_c| \# \quad (2); \text{ and}$$

$$p(y = c|x) = \frac{\exp(-\text{euc}(f_\theta(x), \omega_c))}{\sum_{c'} \exp(-\text{euc}(f_\theta(x), \omega'_c))}; \quad (3)$$

wherein $\omega_c$ represents a mean value of all samples belonging to category c after a function change; $\text{euc}(x, \omega_c)$ represents a distance function; and $p(y=c|x)$ represents a probability function, and is configured to obtain surface defect detection data of the primary cable of the aerostat; $S_c$ represents image samples of the category c in a support set; $x_{sc}$ represents a certain image sample of the category c extracted from $S_c$; x represents an image of the query set; and c represents a sample category; and the multi-mode operation module is configured to select the detection operation modes one by one at a terminal to obtain the surface defect detection data under different detection operation modes.

The present disclosure has at least the following advantages compared with the prior art.

(1) In the present disclosure, the YOLOv4 single-stage detection algorithm based on deep neural network is selected as the benchmark algorithm for cable defect detection, which has certain technical advantages among the current target detection algorithms and has a better detection effect under the same algorithmic time consumption. To comprehensively use the shallow texture features and the high-level semantic features, the DenseNet network is selected in the present disclosure as the basic framework of the detection algorithm, through which the low-level features are frequently passed to the high-level features through skip connections, facilitating improving the detection effect.

(2) In view of the challenges, such as imbalance defective samples, difficulty in manual labeling, and diverse changes in the field environment, the present disclosure adopts image augmentation to increase the diversity of existing samples while augmenting the samples by constructing an adversarial neural network.

(3) Considering that the perforations, and cracks at end point of the cable are very small defects, and therefore are likely to be lost in the high-level features after extracted layer by layer by the deep neural network, and the high-level features have a strong asemanticity, and are of great significance in the classification, the present disclosure selects the DenseNet network as the basic framework for the detection algorithm, which is configured to transfer the low-level features to the high-level features through skip connection, so as to improve the detection effect of subtle defects (e.g., perforations and cracks) at the end point. The present disclosure adopts the focal loss and label smoothing strategy during the deep neural network training to further mitigate the effects of category imbalance.

(4) To satisfy the actual needs of field operators, three operation modes, namely, the image acquisition mode, the offline detection mode and the online detection mode, are provided herein. The three operation modes have different hardware requirements and operating characteristics, where the online detection mode has higher requirements for the hardware configuration. The field staff set the hardware according to the hardware configuration and the demand, which makes the operation easier.

(5) The present disclosure solves the technical problems of high false detection rate, high missed detection rate and low detection efficiency in the prior art.

DETAILED DESCRIPTION OF EMBODIMENTS

To make the objectives, technical solutions and advantages of the embodiments of the present disclosure clearer, the technical solutions in the embodiments of the present disclosure will be described clearly and completely below. Obviously, the described embodiments are a part of the embodiments of the present disclosure. Based on the embodiments in the present disclosure, all other embodiments obtained by one of ordinary skill in the art without creative labor shall fall within the scope of protection of the present disclosure.

Embodiment 1

Figure 1:
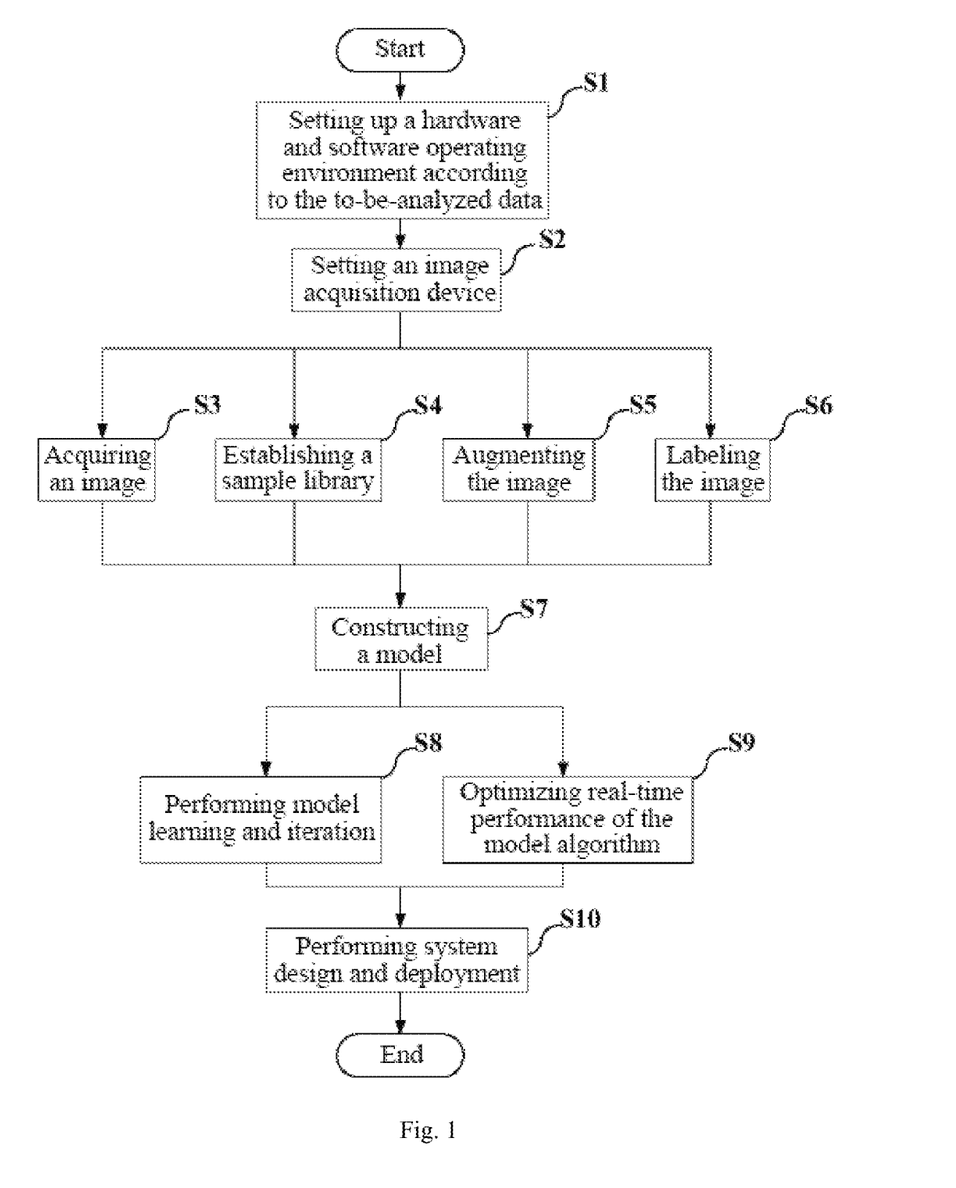
FIG. 1 is a flow chart of a surface defect detection method for a primary cable of an aerostat based on few-shot learning according to Embodiment 1 of the present disclosure.

As shown in FIG. 1, a surface defect detection method for a primary cable of an aerostat based on few-shot learning is provided, which includes the following steps.

(S1) A hardware and software operating environment is set up according to demand analysis data. Optionally, based on the demand for defect detection of the primary cables, the relevant operating environment research is carried out, the system function decomposition is realized, and the system development content is defined.

(S2) An image acquisition device is designed. Optionally, in the hardware design stage, an image acquisition device for the primary cable is designed based on the operating environment and surface conditions of the primary cable.

(S3) An image is acquired. Optionally, the image is acquired using the image acquisition device and is pre-processed.

(S4) A sample library is established.

(S5) The image is augmented. Optionally, the necessary image pre-processing is completed, and the sample library is processed by augmentation through an adversarial network.

(S6) The image is labeled. Optionally, a labeling software is designed for annotating samples to construct a sample database.

(S7) A model is constructed. Optionally, a network model is designed according to the defect characteristics of the primary cable.

(S8) The model is learned and iterated.

(S9) Algorithmic real time of the model is optimized. Optionally, the aforementioned model is iterated and optimized to meet the detection requirements. The algorithm is optimized.

(S10) A system is designed and deployed. Optionally, the model is modified and tailored according to real time and performance requirements, and the system is deployed according to a variety of surface defect detection modes of the primary cable of the aerostat.

Embodiment 2

Figure 2:
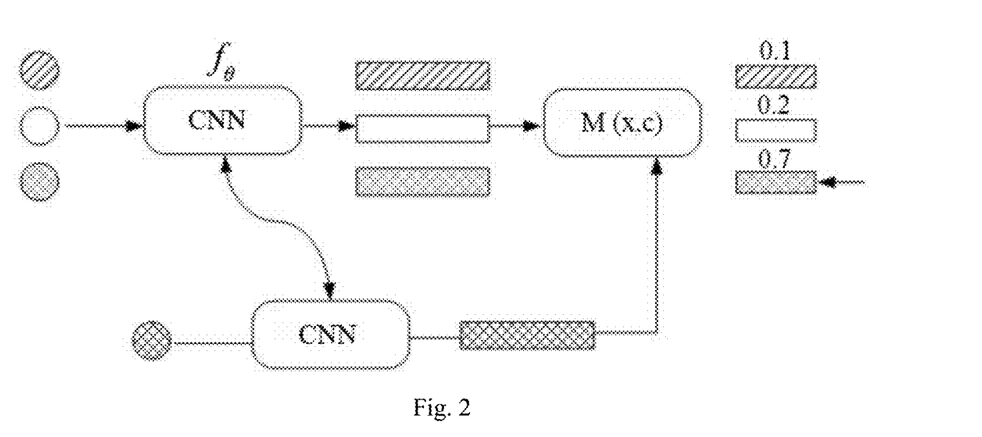
FIG. 2 schematically shows a few-shot metric learning process according to an embodiment of the present disclosure.

As shown in FIG. 2, the few-shot metric learning mainly includes a feature encoding module and a metric module. The support set in FIG. 2 indicates that the category of samples in the data set is known, and the query set indicates that the samples in the data set are to be detected.

Sample Data Augmentation

Figure 3:
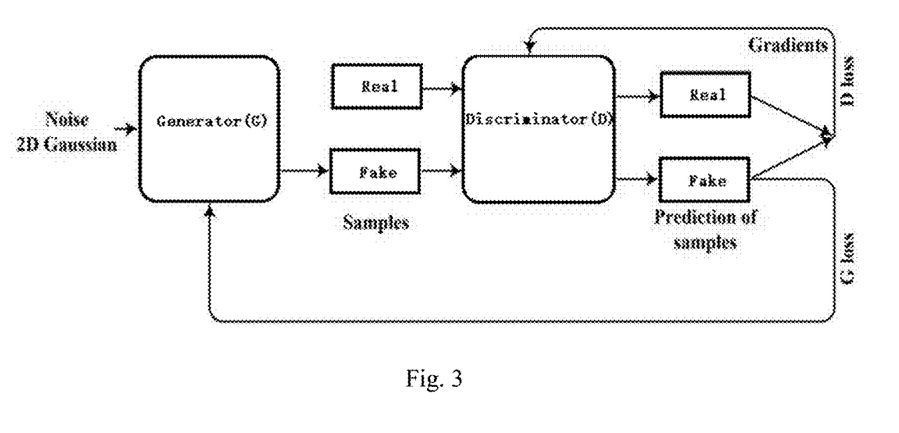
FIG. 3 is a schematic diagram of an adversarial neural network according to an embodiment of the present disclosure.

As shown in FIG. 3, in view of challenges, such as uneven defective samples, difficulty in manual annotation and diverse changes in the field environment, the present disclosure expands the diversity of existing samples using image enhancement while expanding the samples by constructing an adversarial neural network. The Focal loss and label smoothing strategies are adopted during deep neural network training to further mitigate the effects of category imbalance.

The metric logic can be expressed by the following formula:

$$\omega_c = \frac{1}{S_c} \sum_{x \in S_c} f_\theta(x_{sc}); \quad (1)$$

$$euc(x, \omega_c) = \|x - \omega_c\| \# \quad (2); \text{ and}$$

$$p(y = c|x) = \frac{\exp(-euc(f_\theta(x), \omega_c))}{\sum_{c'} \exp(-euc(f_\theta(x), \omega'_c))}; \quad (3)$$

where $\omega_c$ represents a mean value of all samples belonging to category c after a function change.

The formula (2) is a distance function, and the formula (3) is a probability function, where the closer a to-be-determined sample is to $\omega_c$, the closer its probability is to 1. c represents the category. The meaning of the formula (3) is that the closer a sample is to the category c and the further it is from the other category c', the greater the probability that it belongs to c. The adversarial neural network may expand the sample using, for example, the following logic:

$$\nabla_{\theta_d} \frac{1}{m} \sum_{i=1}^m \left[ \log D(x^{(i)}) + \log(1 - D(G(z^{(i)}))) \right]$$

$$-\nabla_{\theta_g} \frac{1}{m} \sum_{i=1}^m \log(1 - D(G(z^{(i)}))); \text{ or}$$

$$\nabla_{\theta_g} \frac{1}{m} \sum_{i=1}^m \log(D(G(z^{(i)})));$$

where m represents the number of samples; Z represents a random noise sample; X represents a real sample; D represents a discriminator; G represents a generator; $\nabla$ represents a gradient; and $\theta$ expresses a constant.

Network Structure Design

Figure 4:
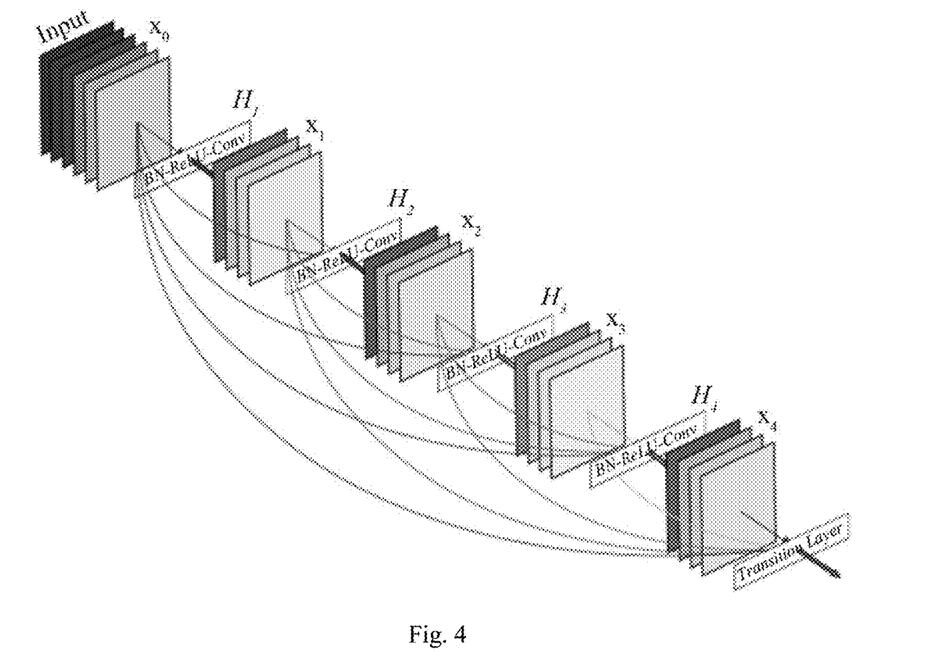
FIG. 4 schematically shows an architecture of a dense convolutional network (DenseNet) according to an embodiment of the present disclosure.

As shown in FIG. 4, considering that the defect detection of the cable has real-time requirements, three cameras need to detect images in 15 frames per second with a single camera for 5 frames. A YOLOv4 single-stage detection algorithm based on deep neural network is selected as the benchmark algorithm for cable defect detection herein, which has certain technical advantages among the current target detection algorithms and has a better detection effect under the same algorithmic consuming time. Considering that the perforations, cracks at end point of the cable are very small defects, and therefore are likely to be lost in the high-level features after extracted layer by layer by deep neural network. In the meanwhile, the high-level features have a strong semantic nature, which is of great significance in the classification judgement. To comprehensively use the shallow texture features and the high-level semantic features, the DenseNet network is selected as the basic framework of the detection algorithm in the present disclosure, which frequently passes the low-level features to the high-level features through jump connections, facilitating to improve the detection effect.

Figure 5:
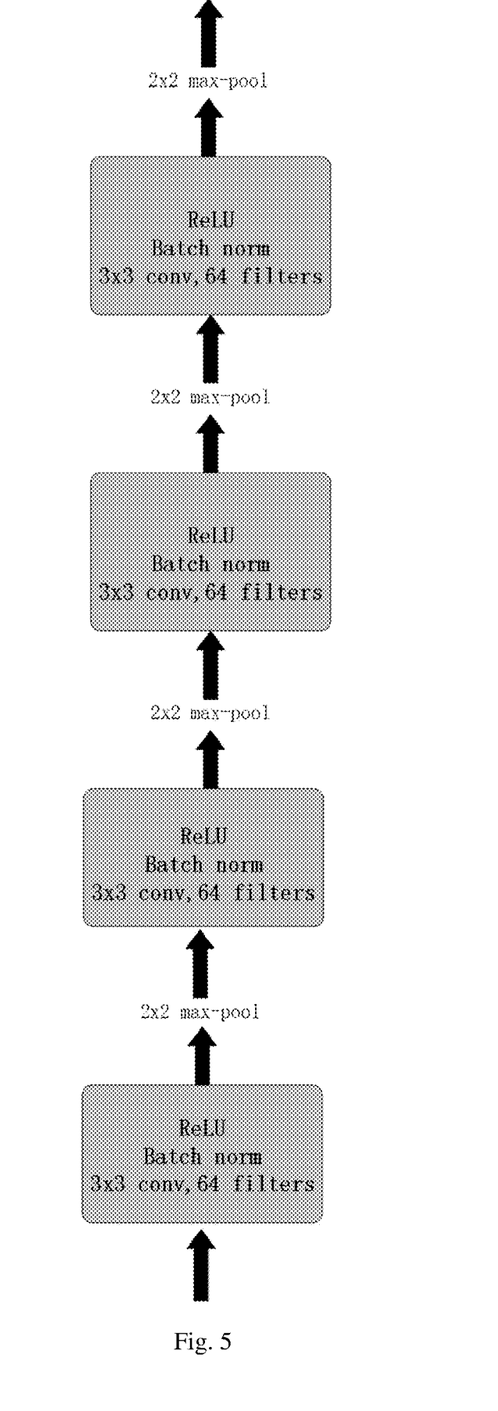
FIG. 5 is a schematic diagram of a few-shot learning encoder according to an embodiment of the present disclosure.

As shown in FIG. 5, a typical coder in the few-shot learning is adopted herein. The coder consists of four convolutional layers. A size of each convolutional layer is 3*3. The number of the convolution kernel is 64. The main function of the convolutional layer is to map the images into the same feature space, in which the images of the same category will be more similar in terms of the extracted features.

System Interface Design

Figure 6:
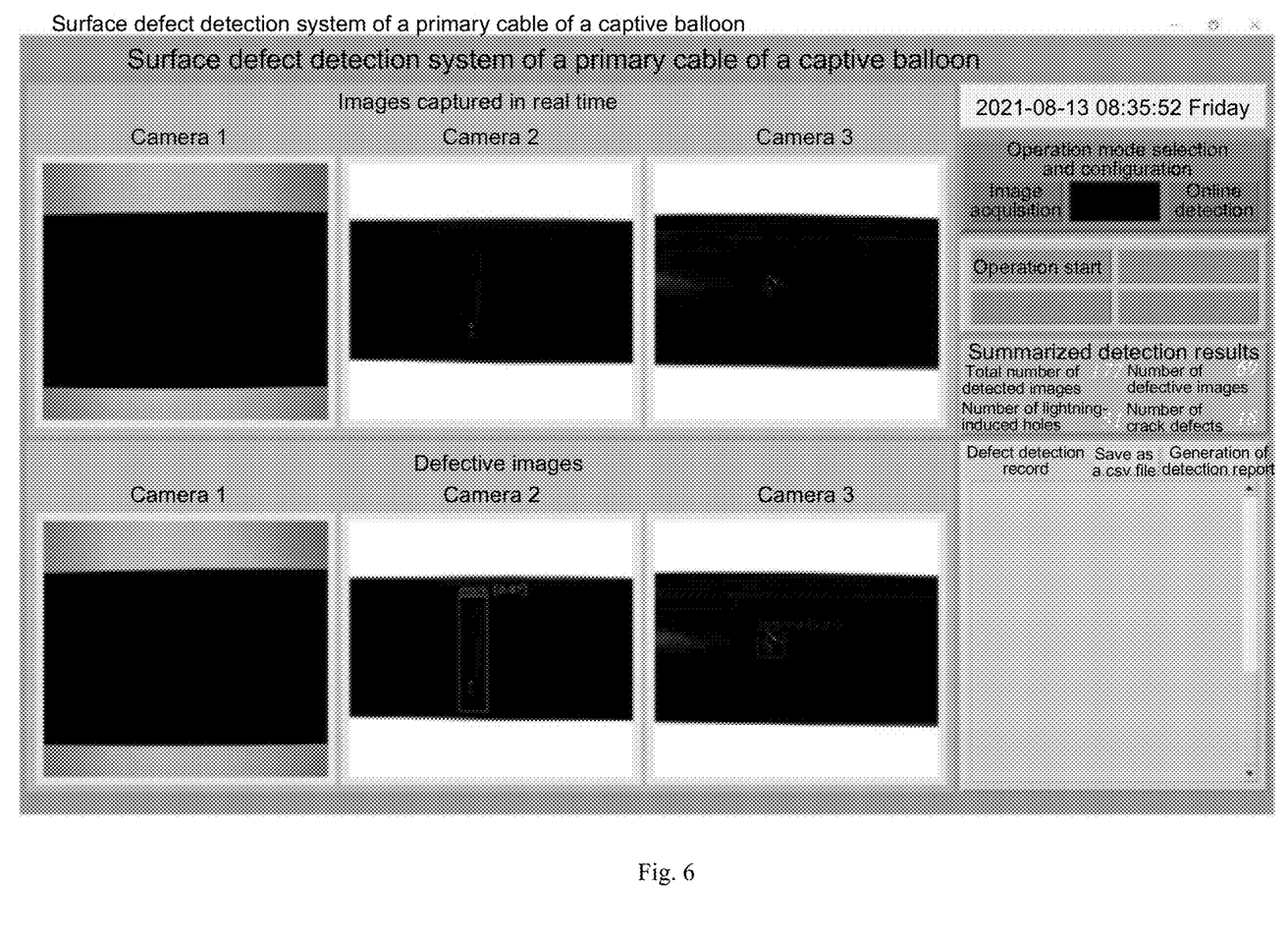
FIG. 6 schematically shows an interface of a surface defect detection system according to an embodiment of the present disclosure.

As shown in FIG. 6, the system collects images from three cameras in real time, where the image of the current to-be-detected cable in real time is displayed on the upper left of the interface; the defective images is displayed on the lower left of the interface if defects are detected for final confirmation by staff; and stores the corresponding defective images are stored for later inquiry. On the right side of the interface, the defect detection results are summarized, the detailed records of the defect detection are displayed, and buttons for generating detection reports and saving detection records are provided. To satisfy the actual needs of field operators, three operation modes, namely, the image acquisition mode, the offline detection mode and the online detection mode, are provided herein. The image acquisition mode is only for collecting images captured by the camera to facilitate post-processing. The offline detection mode is configured to perform defect detection on the locally collected images. The online detection mode is configured to perform defect detection while collecting images, and can be interpreted as a fusion of image collection and offline inspection. The three operation modes have different hardware requirements and operating characteristics, where the online detection mode has higher hardware configuration requirements. The field staff make arrangements according to the site hardware configuration and the usage demand, which is easier to operate.

Test Verification

Figure 7A:
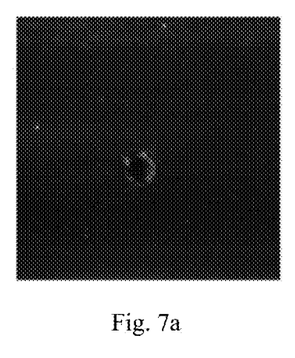
FIGS. 7a-7c are images of samples, where 7a: lightning-damaged sample; 7b: crack sample; and 7c: normal sample.
Figure 7B:
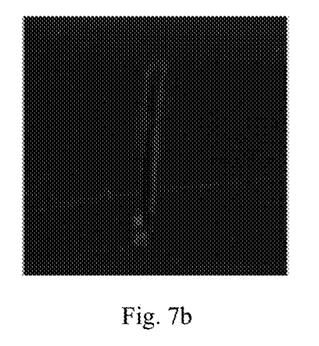
Figure 7C:
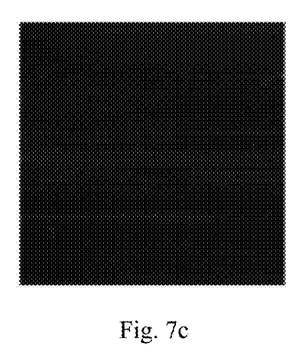

As shown in FIGS. 7*a*-*c*, the primary cable was photographed with a camera to obtain samples containing defective data samples and normal data samples. After that, each image is subjected to median filtering to remove the noise interference during shooting. The obtained data set contains three categories of data, namely, lightning-perforation images, crack images and normal images. The data set contains a total of 60 images. Some of the samples in the data set are shown in FIGS. 7*a*-7*c*. The number of images in each category in the data set is shown in Table 1 below:

TABLE 1

Data details of each category

| Data set | Lightning-damaged image | Crack image | Normal image |
|---|---|---|---|
| Number | 22 | 15 | 23 |

In summary, the YOLOv4 single-stage detection algorithm based on deep neural network is selected as the benchmark algorithm for cable defect detection, which has certain technical advantages among the current target detection algorithms and has a better detection effect under the same algorithmic consuming time. To comprehensively use the shallow texture features and the high-level semantic features, the DenseNet network is selected as the basic framework of the detection algorithm in the present disclosure, which frequently passes the low-level features to the high-level features through jump connections, facilitating to improve the detection effect.

The present disclosure is directed against challenges, such as uneven defective samples, difficulty in manual annotation, and diverse changes in the field environment, to expand the diversity of existing samples using image enhancement while expanding the samples by constructing an adversarial neural network.

Considering that the perforations, cracks at end point of the cable are very small defects, and therefore are likely to be lost in the high-level features after extracted layer by layer by deep neural network. In the meanwhile, the high-level features have a strong semantic nature, which is of great significance in the classification judgement. Therefore, the present disclosure selects the DenseNet network as the basic framework of the detection algorithm, which is configured to transfer the low-level features to the high-level features through jumping connection, so as to improve the detection effect of subtle defects (e.g., perforations and cracks) at the endpoint. The present disclosure adopts the focal loss and label smoothing strategies during deep neural network training to further mitigate the effects of category imbalance.

To satisfy the actual needs of field operators, three operation modes, namely, the image acquisition mode, the offline detection mode and the online detection mode, are provided herein. The three operation modes have different hardware requirements and operating characteristics, where the online detection mode has higher hardware configuration requirements. The field staff make arrangements according to the site hardware configuration and the usage demand, which is easier to operate.

The present disclosure can solve the technical problems of high false negative rate, high false positive rate and low detection efficiency in the prior art.

The above embodiments are merely intended to illustrate the technical solutions of the present disclosure, and are not intended to limit the present disclosure. Although embodiments of the present disclosure have been described in detail above, it should be understood by those skilled in the art that it is still possible to modify the technical solutions recorded in these embodiments or to make equivalent replacements for some of the technical features disclosed therein. Such modifications or replacements made without departing from the spirit and scope of the present disclosure shall fall within the scope of the disclosure defined by the appended claims.

What is claimed is:

1. A surface defect detection method for a primary cable of an aerostat based on few-shot learning, comprising:
   (S1) initializing a system environment; and setting system parameters and detection operation modes;
   (S2) acquiring a surface image of the primary cable of the aerostat; processing the surface image by augmentation through a preset adversarial network to obtain an augmented surface image data of the primary cable; and labeling the augmented surface image data to construct a surface defect sample library of the primary cable;
   (S3) designing a defect detection network model of the primary cable based on a dense convolutional network (DenseNet) and defect characteristics of the primary cable; constructing the defect detection network model by few-shot learning; and training the defect detection network model based on the surface defect sample library to obtain a trained defect detection network model;
   (S4) processing a query set in the surface defect sample library based on the trained defect detection network model using a YOLOv4 single-stage detection algorithm to obtain shallow texture features and high-level semantic features;
   (S5) transferring the shallow texture features to the high-level semantic features through skip connection using a structure of the DenseNet of the trained defect detection network model; and processing the shallow texture features and the high-level semantic features through the following metric logic:

$$\omega_c = \frac{1}{S_c} \sum_{x \in S_c} f_\theta(x_{sc}); \quad (1)$$

$$\mathrm{euc}(x, \omega_c) = |x - \omega_c| \# \quad (2); \text{ and}$$

$$p(y = c|x) = \frac{\exp(-\mathrm{euc}(f_\theta(x), \omega_c))}{\sum_{c'} \exp(-\mathrm{euc}(f_\theta(x), \omega'_c))}; \quad (3)$$

wherein $\omega_c$ represents a mean value of all samples belonging to category c after a function change; $\mathrm{euc}(x, \omega_c)$ represents a distance function; and $p(y=c|x)$ represents a probability function, and is configured to obtain surface defect detection data of the primary cable of the aerostat; $S_c$ represents image samples of the category c in a support set; $x_{sc}$ represents a certain image sample of the category c extracted from $S_c$; x represents an image of the query set; and c represents a sample category; and
   (S6) selecting the detection operation modes one by one at a terminal to obtain the surface defect detection data under different detection operation modes.

2. The surface defect detection method of claim 1, wherein step (S1) comprises:
   (S11) collecting and storing operation environment data of the primary cable; and
   (S12) setting up an image acquisition device and presetting an image filter according to the operation environment data.

3. The surface defect detection method of claim 2, wherein a filtering method of the image filter comprises median filtering.

4. The surface defect detection method of claim 2, wherein in step (S12), the image acquisition device comprises two or more cameras; and the two or more cameras are arranged at a position where the surface image of the primary cable is acquired.

5. The surface defect detection method of claim 1, wherein step (S2) comprises:
   (S21) acquiring, by the image acquisition device, the surface image of the primary cable of the aerostat;
   (S22) processing the surface image by augmentation to obtain an augmented surface image of the primary cable;
   (S23) processing the augmented surface image through the preset adversarial network according to the following logical augmentation to obtain the augmented surface image data:

$$\nabla_{\theta_d} \frac{1}{m} \sum_{i=1}^{m} \left[\log D(x^{(i)}) + \log(1 - D(G(z^{(i)})))\right]$$

$$-\nabla_{\theta_g} \frac{1}{m} \sum_{i=1}^{m} \log(1 - D(G(z^{(i)}))); \text{ or}$$

$$\nabla_{\theta_g} \frac{1}{m} \sum_{i=1}^{m} \log(D(G(z^{(i)})));$$

wherein m represents the number of samples; Z represents a random noise sample; X represents a real sample; D represents a discriminator; G represents a generator; $\nabla$ represents a gradient, and $\theta$ expresses a constant; and
   (S24) labeling the augmented surface image data to construct the surface defect sample library of the primary cable.

6. The surface defect detection method of claim 5, wherein in step (S21), the surface image of the primary cable of the aerostat comprises a lightning-strike damage image, a crack image and a normal image.

7. The surface defect detection method of claim 1, wherein step (S3) comprises:
   (S31) obtaining the defect characteristics of the primary cable; and designing the defect detection network model of the primary cable according to the defect characteristics with the DenseNet as a basic framework; and
   (S32) constructing, by a few-shot learning coder, the defect detection network model; and training the defect detection network model using Focal loss and label smoothing strategy based on a support set in the surface defect sample library of the primary cable.

8. The surface defect detection method of claim 7, wherein step (S32) comprises:
   (S321) extracting the support set from the surface defect sample library of the primary cable;
   (S322) setting the number of convolutional layers of the few-shot learning encoder in the defect detection network model to be 4;
   (S323) setting a size of each of the convolutional layers to be 3*3; and
   (S324) setting a convolution kernel of the few-shot learning encoder to be 64.

9. The surface defect detection method of claim 1, wherein in step (S6), the detection operation modes comprise an image acquisition mode, an offline detection mode and an online detection mode; the image acquisition mode is configured to collect images captured by a camera for post-processing; the offline detection mode is configured to perform defect detection on locally-captured images; and the online detection mode is configured to integrate the image acquisition mode and the offline detection mode for online detection of the surface defect detection data of the primary cable.

10. A surface defect detection system for a primary cable of an aerostat based on few-shot learning, comprising:
  a hardware-software integrated environment setting module;
  a sample library construction and augmentation module connected to the hardware-software integrated environment setting module;
  a model construction and training module connected to the sample library construction and augmentation module;
  a feature acquisition module connected to the model construction and training module;
  a defect detection module connected to the feature acquisition module; and
  a multi-mode operation module connected to the defect detection module and the hardware-software integrated environment setting module;
  wherein the hardware-software integrated environment setting module is configured to initialize a system environment and set system parameters and detection operation modes;
  the sample library construction and augmentation module is configured to acquire a surface image of the primary cable of the aerostat, process the surface image by augmentation through a preset adversarial network to obtain an augmented surface image data of the primary cable, and label the augmented surface image data to construct a surface defect sample library of the primary cable;
  the model construction and training module is configured to design a defect detection network model of the primary cable based on DenseNet and defect characteristics of the primary cable, construct the defect detection network model using few-shot learning, and train the defect detection network model based on the surface defect sample library to obtain a trained defect detection network model;
  the feature acquisition module is configured to process a query set in the surface defect sample library based on the trained defect detection network model using a YOLOv4 single-stage detection algorithm to obtain shallow texture features and high-level semantic features;
  the defect detection module is configured to transfer the shallow texture features to the high-level semantic features through skip connection using a structure of the DenseNet of the trained defect detection network model, and process the shallow texture features and the high-level semantic features through the following metric logic:

$$\omega_c = \frac{1}{S_c} \sum_{x \in S_c} f_\theta(x_{sc}); \quad (1)$$

$$euc(x, \omega_c) = |x - \omega_c| \# \quad (2); \text{ and}$$

$$p(y = c|x) = \frac{\exp(-euc(f_\theta(x), \omega_c)}{\sum_{c'} \exp(-euc(f_\theta(x), \omega'_c))}; \quad (3)$$

wherein $\omega_c$ represents a mean value of all samples belonging to category c after a function change; $euc(x, \omega_c)$ represents a distance function; and $p(y=c|x)$ represents a probability function, and is configured to obtain surface defect detection data of the primary cable of the aerostat; $S_c$ represents image samples of the category c in a support set; $x_{sc}$ represents a certain image sample of the category c extracted from $S_c$; x represents an image of the query set; and c represents a sample category; and
  the multi-mode operation module is configured to select the detection operation modes one by one at a terminal to obtain the surface defect detection data under different detection operation modes.

* * * * *